United States Patent
Chuang

(10) Patent No.: US 9,292,411 B2
(45) Date of Patent: Mar. 22, 2016

(54) WIRELESS DEBUGGING AND UPDATING OF FIRMWARE

(71) Applicant: Phoenix Technologies Ltd., Campbell, CA (US)

(72) Inventor: Chia Chien Chuang, Taipei County (TW)

(73) Assignee: Phoenix Technologies Ltd., Campbell, CA (US)

( * ) Notice: Subject to any disclaimer, the term of this patent is extended or adjusted under 35 U.S.C. 154(b) by 383 days.

(21) Appl. No.: 13/789,153

(22) Filed: Mar. 7, 2013

(65) Prior Publication Data

US 2014/0068342 A1 Mar. 6, 2014

(30) Foreign Application Priority Data

Sep. 3, 2012 (TW) .............................. 101132077 A

(51) Int. Cl.
*G06F 11/00* (2006.01)
*G06F 11/36* (2006.01)
*G06F 13/00* (2006.01)

(52) U.S. Cl.
CPC .......... *G06F 11/362* (2013.01); *G06F 11/3656* (2013.01); *G06F 13/00* (2013.01)

(58) Field of Classification Search
CPC ........................... G06F 11/362; G06F 11/3656
USPC .................................................. 714/27, 28, 29
See application file for complete search history.

(56) References Cited

U.S. PATENT DOCUMENTS

| 8,660,817 | B2* | 2/2014 | Jiang et al. ..................... 702/183 |
| 2006/0048006 | A1* | 3/2006 | Lou ................................. 714/25 |
| 2008/0168435 | A1* | 7/2008 | Tupman et al. ............... 717/173 |
| 2009/0217256 | A1* | 8/2009 | Kim .............................. 717/168 |
| 2009/0318124 | A1* | 12/2009 | Haughn ....................... 455/418 |
| 2010/0175062 | A1* | 7/2010 | Kim .............................. 717/173 |

FOREIGN PATENT DOCUMENTS

| TW | 200622590 A1 | 7/2006 |
| TW | 200630879 A1 | 9/2006 |
| TW | I263130 B1 | 10/2006 |
| TW | 2011009913 A1 | 3/2011 |

OTHER PUBLICATIONS

ROC (Taiwan) Intellectual Property Office, Office Action of the Intellectual Property Office (Mandarin translation), Sep. 23, 2014, 10 pp.
ROC (Taiwan) Intellectual Property Office, Office Action of the Intellectual Property Office (English translation), Sep. 23, 2014, 7 pp.

* cited by examiner

*Primary Examiner* — Dieu-Minh Le
(74) *Attorney, Agent, or Firm* — Brokaw Patent Law P.C.; Christopher J. Brokaw

(57) ABSTRACT

A debug control system and method thereof which includes a debug device and a wireless communication module. The debug device is configured to communicate electrical data with a target device via a first signal transmission interface. The wireless communication module is configured to communicate electrical data with the debug device via a second communication interface, and is configured to communicate electrical data with a host device. Electrical data exchanged between the debug control system and the target device is configured to debug or update firmware residing on the target device.

25 Claims, 5 Drawing Sheets

WIRELESS DEBUGGING AND UPDATING OF FIRMWARE

CLAIM OF PRIORITY

This patent application claims priority to Taiwanese patent application 101132077, filed Sep. 3, 2012, entitled "Debug Control System and Method Thereof," invented by Chia Chien Chuang, the contents of which are hereby incorporated by reference in their entity for all purposes as if fully set forth herein.

FIELD OF THE INVENTION

The present invention generally relates to wirelessly debugging and/or updating firmware.

BACKGROUND

Currently, to debug firmware resident on a first device from a second device, it is necessary to connect the first device and the second device using a physical cable. This is so because a bi-directional electronic data exchange tunnel is necessary for firmware, such as BIOS, to allow another machine to debug the firmware.

However, due to the differences of data transmission interfaces, (e.g., Parallel Ports and Serial Ports), there are difficulties in establishing the bi-directional electronic data exchange tunnel. Moreover, the host machine may not be able to debug the target device with a cable due to the limitations of geographical environments.

SUMMARY

In accordance with one embodiment of the present invention, a debug control system comprises a debug device and a wireless communication module. The debug device is configured to exchange electrical data with a target device via a first signal transmission interface. The wireless communication module is configured to exchange electrical data with the debug control device via a second signal transmission interface, and to exchange electrical data with a host machine via a wireless communication protocol.

In accordance with one embodiment of the present invention, a method of the debug control comprises the steps of generating a first probing signal to detect a protocol type of a wireless communication module, broadcasting a handshake signal, establishing a wireless data exchange tunnel, and debugging a target device via the wireless communication tunnel. The wireless communication tunnel is established between a host machine and a debug device.

In order to provide further understanding of the techniques, means, and effects of the current disclosure, the following detailed description and drawings are hereby presented, such that the purposes, features and aspects of the current disclosure may be thoroughly and concretely appreciated; however, the drawings are provided solely for reference and illustration, without any intention to be used for limiting the current disclosure.

BRIEF DESCRIPTION OF THE DRAWINGS

The objectives and advantages of the present invention are illustrated with the following description and upon reference to the accompanying drawings in which.

DETAILED DESCRIPTION

Figure 1:
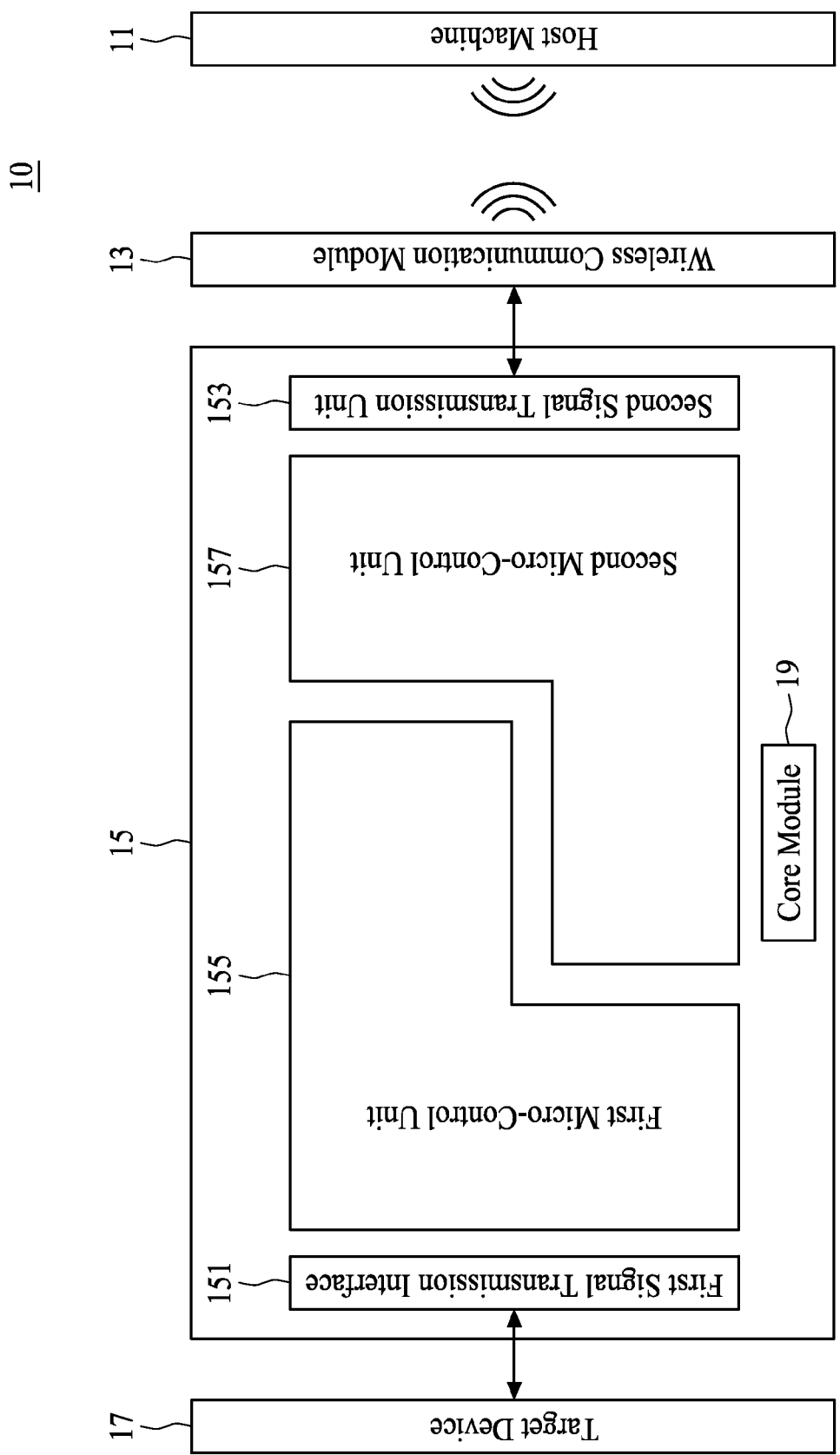
FIG. 1 is a schematic view of a function block diagram showing a debug control system of one embodiment of the present invention.

Embodiments of the invention are directed towards a debug control system and a method thereof. FIG. 1 is a schematic view of a function block diagram showing a debug control system 10 of one embodiment of the present invention.

In one embodiment of the present invention, the debug control system 10 comprises a host machine 11, a wireless communication module 13, a debug device 15 and a target device 17. The debug device 15 further comprises a first signal transmission interface 151, a second signal transmission interface 153, a core module 19, a first micro-control unit 155, and a second micro-control unit 157.

The debug device 15 is configured to exchange electrical data with the target device 17 via the first signal transmission interface 151. The wireless communication module 13 is configured to exchange electrical data with the debug control device 15 via the second signal transmission interface 153 and to exchange electrical data with the host machine 11 via a wireless communication protocol. The wireless communication module 13 may include a firmware that is stored in the core module 19 of the debug device 15. Moreover, the firmware may include a BIOS (Basic Input/Output System).

In addition, the first signal transmission interface 151 may include a USB (Universal Serial Bus), an I²C (Inter-Integrated Circuit), a UART (Universal Asynchronous Receiver-Transmitter), an SPI (Serial Peripheral Interface) or a PS/2 connector, and the like. The first signal transmission interface 151 of one embodiment of the present invention may include a combination of said interfaces.

The second signal transmission interface 153 may include an I²C, a UART or an SPI. The second transmission interface 153 of one embodiment of the present invention may include a combination of said interfaces.

The host machine 11 may correspond to any type of computer, such as a portable electronic device or a desktop computer. Other examples of host machine 11 include a PDA, a laptop, a tablet PC, and a smart phone.

The wireless communication protocol in which wireless communication module 13 communicates with host machine 11 may include a variety of different wireless protocols, including Bluetooth and IEEE 802.11. The wireless communication protocol of one embodiment of the present invention may include a combination of said protocols.

A wireless data exchange tunnel may need to be established before the debug device 15 starts exchanging electronic data with the target device 17 and the wireless communication module 13. Furthermore, the wireless data exchange tunnel may meet the requirements of the wireless communication protocol.

When the wireless data exchange tunnel has been established, the debug device 15 may generate a first probing signal to detect a protocol type and the firmware version of the wireless communication module 13. If the firmware version of the wireless communication module 13 is not up-to-date, the firmware of the wireless communication module 15 may be updated.

Meanwhile, the debug control system 10 may enter into a crisis mode and all work in operation may be stopped. Therefore, the updating of the firmware may be achieved by the wireless communication module 13, the wireless data exchange tunnel, and the host machine 11.

Furthermore, if the firmware of the wireless communication module 13 is up-to-date, the host machine 13 may be capable of debugging the target device via the wireless data exchange tunnel, the wireless communication module 13, and the debug device 15.

Figure 2:
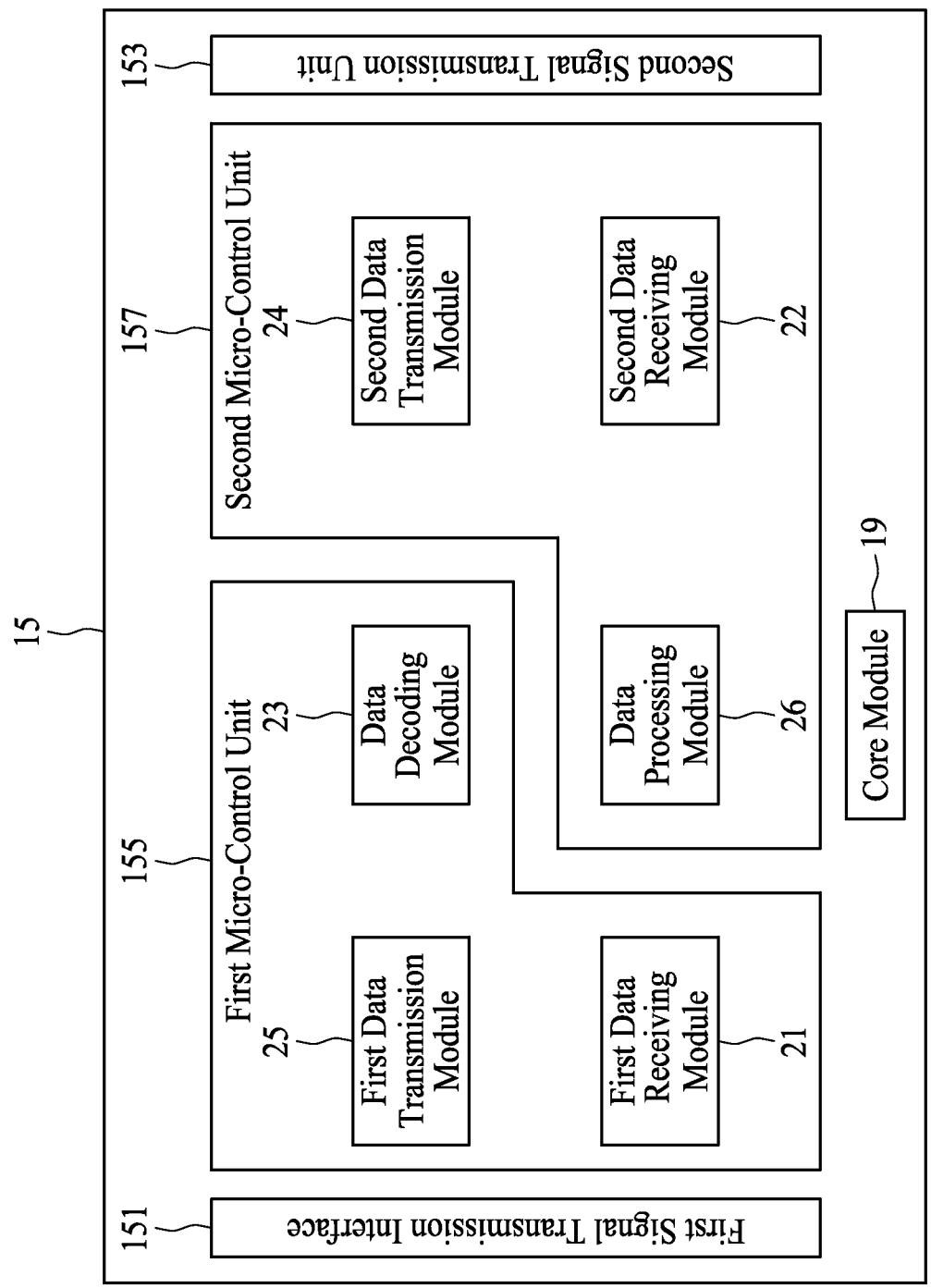
FIG. 2 is a schematic view of a detailed function block diagram of the debug device of one embodiment of the present invention.

FIG. 2 is a schematic view of a detailed function block diagram of the debug device 15 of one embodiment of the present invention. As shown in FIG. 2, in one embodiment of present invention, the first micro-control unit 155 may further include a first data receiving module 21, a first data transmission module 25, and a data decoding module 23. The second micro-control unit 157 may further include a second data receiving module 22, a second data transmitting module 24 and a data processing module 26.

Figure 3:
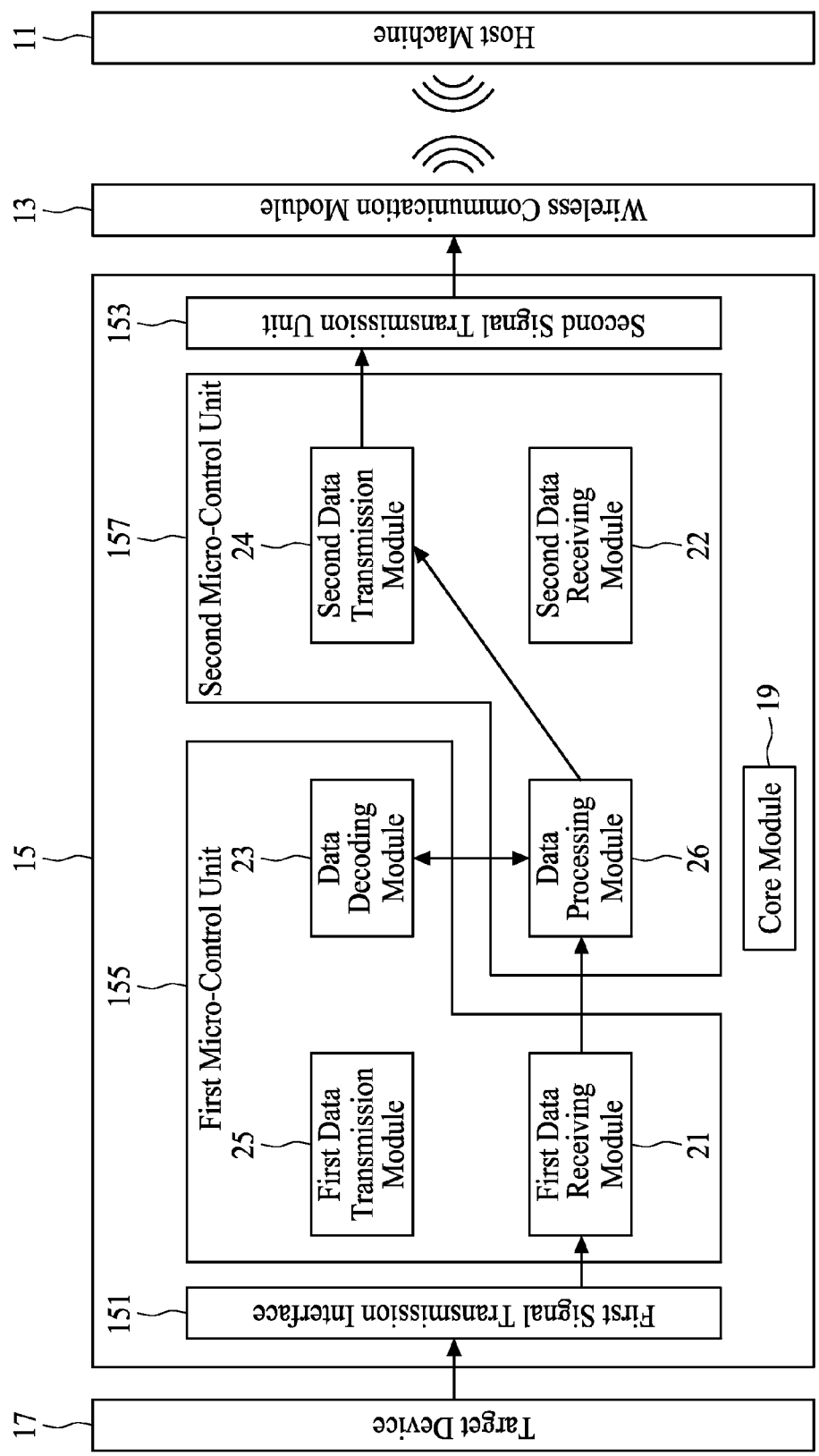
FIG. 3 is a flow chart of the electronic data processing of one embodiment of the present invention.

FIG. 3 is a flow chart of the electronic data processing of one embodiment of the present invention. As shown in FIG. 3, the first data receiving module 21 is configured to receive a first electronic data, via the first signal transmission module 151, from the target device 17. If the transmission format of the first electronic data does not meet the requirements of the transmission format of the first transmission interface 151, the first data receiving module 21 may refuse to receive the first electronic data.

If the transmission format of the first electronic data meets the requirements of the transmission format of the first transmission interface 151, the first data receiving module 21 may transmit the first electronic data to the data processing module 26. The data processing module 26 may transmit the first electronic data, (for example, using an 8-bit data BUS and the like), to the data decoding module 23 for decoding the first electronic data in order to generate second electronic data which is readable by the data processing module 26. Next, the data decoding module 23 may transmit the second electronic data back to the data processing module 26. After the data processing module 26 has done the processing work of the second electronic data, the second electronic data may be converted to third electronic data. The third electronic data may have a transmission format which meets the requirements of the transmission format of the second transmission interface 153. Moreover, the third electronic data may be transmitted to the wireless communication module 13 via the second signal transmission interface 153. Next, the third electronic data may be transmitted to the host machine 11 with a transmission format which meets the requirements of the wireless communication protocol.

Figure 4:
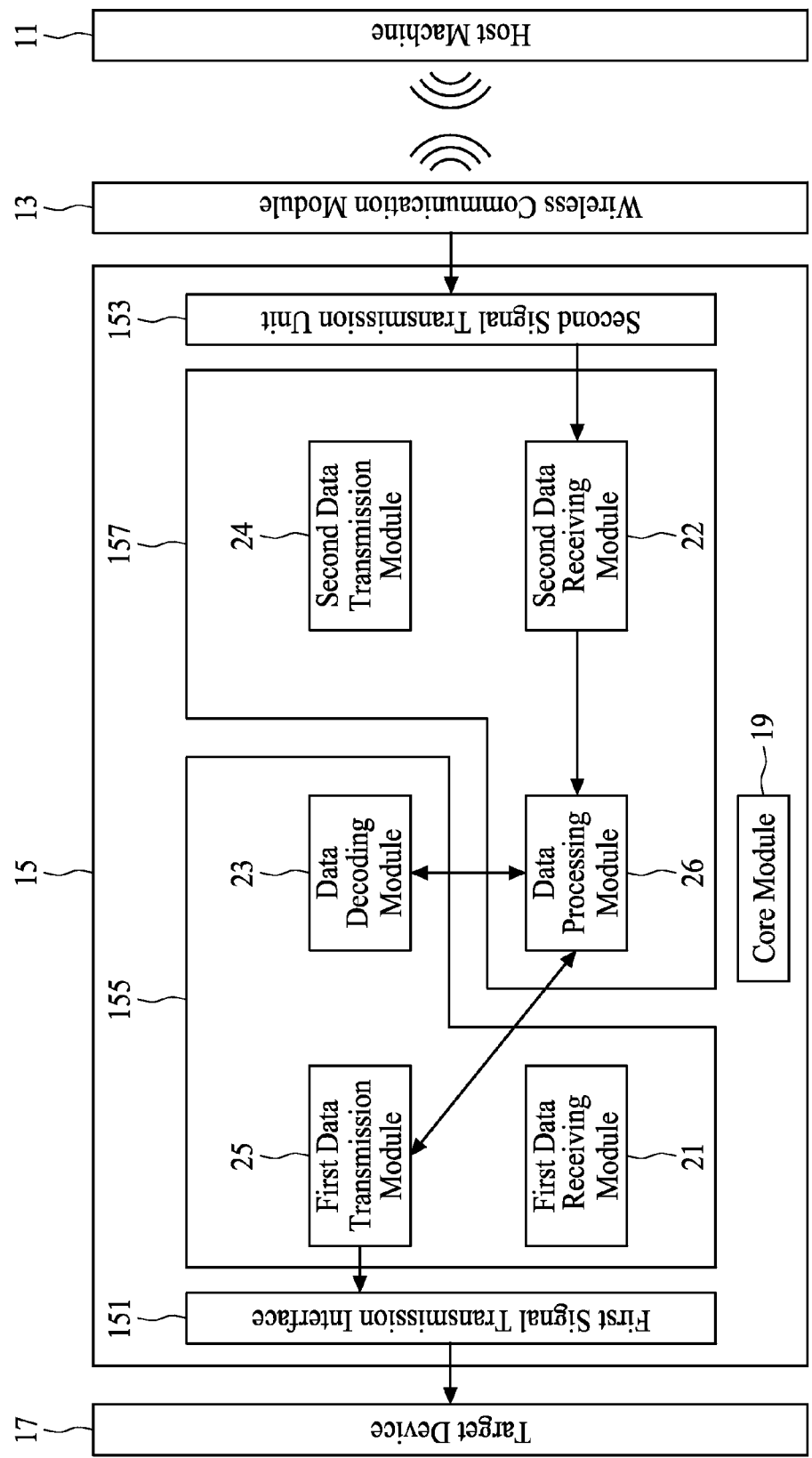
FIG. 4 a flow chart of the electronic data processing of one embodiment of the present invention.

FIG. 4 is a flow chart of the electronic data processing of one embodiment of the present invention. As shown in FIG. 4, the second signal receiving module 22 is configured to receive fourth electronic data which is sent from the second signal transmission interface 153. The fourth electronic data is transmitted to the wireless communication module 13 with a transmission format which meets the requirements of the wireless communication protocol. Next, the wireless communication module 13 may convert the transmission format of the fourth electronic data to a transmission format which meets the requirements of the second signal transmission interface. If the transmission format of the fourth electronic data does not meet the requirements of the second transmission interface 153, the second data receiving module 22 may refuse to receive the fourth electronic data.

If the transmission format of the fourth electronic data meets the requirements of the second transmission interface 153, the second data receiving module 22 may transmit the fourth electronic data to the data processing module 26. The data processing module 26 may transmit the fourth electronic data (for example, using an 8-bit data BUS and the like) to the data decoding module 23 for decoding the fourth electronic data in order to generate fifth electronic data which is readable to the data processing module 26. Next, the data decoding module 23 may transmit the fifth electronic data back to the data processing module 26. After the data processing module 26 has done the processing work on the fifth electronic data, the fifth electronic data may be converted to a sixth electronic data. The sixth electronic data may have a transmission format which meets the requirements of the first transmission interface 151. Moreover, the sixth electronic data may be transmitted to the target device 17 via the first signal transmission interface 151.

Figure 5:
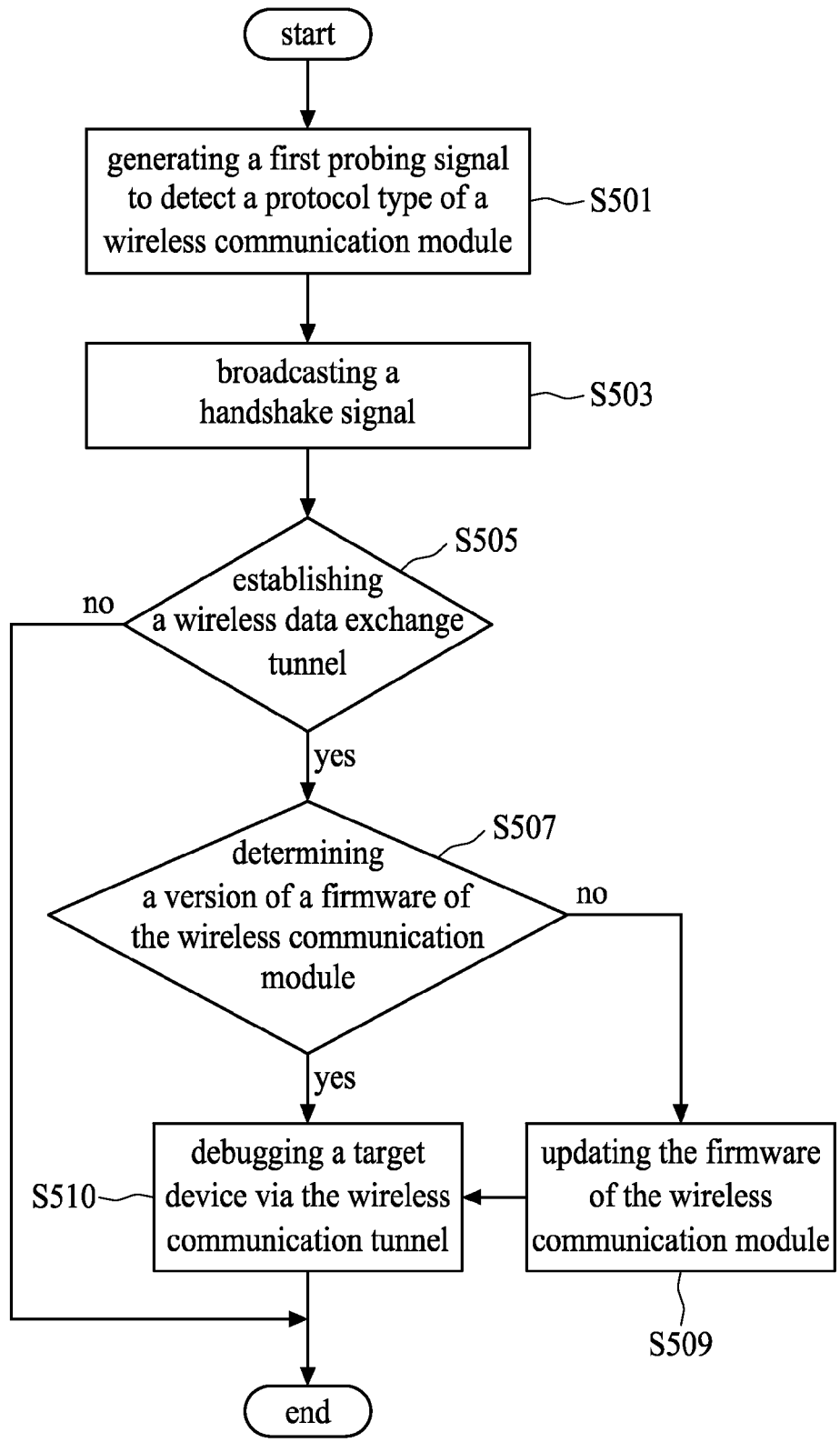
FIG. 5 is a flow chart of a method of a debug control of one embodiment of the present invention.

One embodiment of the present invention corresponds to a method for debugging firmware wirelessly. FIG. 5 is a flow chart of wirelessly debugging firmware accordingly to an embodiment of the present invention. As shown in FIG. 5, in step S501, when the debug device 15 is respectively coupled to the target device 17 by the first signal transmission interface 151 and to the wireless communication module 13 by the second signal transmission interface 153, the debug device may generate a first probing signal to detect a protocol-type of the wireless communication module 13. In step S503, the debug device 15 and the host machine 11 may broadcast a wireless handshake signal, respectively. In step S505, the debug device 15 and the host machine 11 may generate an acknowledge signal for establishing a wireless data exchange tunnel, respectively. If the wireless data exchange tunnel cannot be established, the host machine 11 cannot debug the target device 17 via the wireless communication module 13 and the debug device 15.

If the wireless data exchange tunnel is established, step S507 may be performed. In step S507, the firmware of the wireless communication module 13 may be identified. At this point, if the firmware of the debug device 15 is not up-to-date, the debug control system may enter into a crisis mode and all work of the debug control system may be stopped and step S509 may be performed. The firmware of the wireless communication module 13 may be updated by the host machine 11 via the wireless data exchange tunnel.

After step S509 is performed, step S510 may be performed. In step S510, the host machine 11 may be able to exchange electronic data with the wireless communication module 13 via the wireless data exchange tunnel, which means the host machine may be able to debug the target device 17 via a path formed with the wireless data exchange tunnel, the wireless communication module and the debug device 15.

If the firmware of the debug device 15 is up-to-date, step S510 may be performed. Therefore, the host machine 11 may be able to exchange electronic data with the wireless communication module 13 via the wireless data exchange tunnel, which means the host machine may be able to debug the target device 17 via a path formed with the wireless data exchange tunnel, the wireless communication module and the debug device 15.

Although the present invention and its objectives have been described in detail, it should be understood that various changes, substitutions and alterations can be made herein without departing from the spirit and scope of the invention as defined by the appended claims. For example, many of the processes discussed above can be implemented using different methodologies, replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A debug control system, comprising:
    a debug device configured to exchange electrical data with a target device via a first signal transmission interface; and
    a wireless communication module configured to exchange electrical data with the debug control device via a second signal transmission interface and to exchange electrical data with a host machine via a wireless communication protocol,
    wherein the electrical data exchanged between the debug control system and the target device is configured to update firmware residing on the target device by performing:
        upon the debug device determining that the firmware on the target device is up-to-date, the debug device establishing a wireless data exchange tunnel over which the host machine debugs the firmware on the target device via a wireless data exchange tunnel,
        wherein the host machine debugs the firmware on the target device without installing a new version of the firmware on the target device.

2. The debug control system of claim 1, wherein the debug device further comprises:
    a first micro-control unit, which further comprises:
        a data decoding module;
        a first data receiving module; and
        a first data transmission module; and
    a second micro-control unit, which further comprises:
        a data processing module;
        a second data receiving module; and
        a second data transmission module.

3. The debug control system of claim 1, wherein the debug device comprises a core module, wherein the core module comprises the firmware of the wireless communication module.

4. The debug control system of claim 3, wherein the firmware comprises a BIOS (Basic Input/Output System).

5. The debug control system of claim 1, wherein the first signal transmission interface comprises a USB (Universal Serial Bus).

6. The debug control system of claim 1, wherein the first signal transmission interface comprises an I$^2$C (Inter-Integrated Circuit).

7. The debug control system of claim 1, wherein the first signal transmission interface comprises a UART (Universal Asynchronous Receiver-Transmitter).

8. The debug control system of claim 1, wherein the first signal transmission interface comprises an SPI (Serial Peripheral Interface).

9. The debug control system of claim 1, wherein the first signal transmission interface comprises a PS/2.

10. The debug control system of claim 1, wherein the second signal transmission interface comprises an I$^2$C.

11. The debug control system of claim 1, wherein the second signal transmission interface comprises a UART.

12. The debug control system of claim 1, wherein the second signal transmission interface comprises an SPI.

13. The debug control system of claim 1, wherein the host machine comprises a portable electronic device.

14. The debug control system of claim 13, wherein the portable electronic device comprises a PDA, a laptop, a tablet PC or a smart phone.

15. The debug control system of claim 1, wherein the host machine comprises a desktop.

16. The debug control system of claim 1, wherein the wireless communication protocol comprises Bluetooth.

17. The debug control system of claim 1, wherein the wireless communication protocol comprises IEEE 802.11.

18. The debug control system of claim 1, wherein the target device comprises an electronic device having firmware.

19. A method of a debug control, comprising the steps of:
    generating a first probing signal to detect a protocol-type of a wireless communication module;
    broadcasting a handshake signal;
    establishing a wireless data exchange tunnel; and
    debugging a firmware of a target device via the wireless communication tunnel without installing a new version of the firmware on the target device;
    wherein the wireless communication tunnel is established between a host machine and a debug device.

20. The method of claim 19, wherein the step of establishing a wireless data exchange tunnel further comprises generating an acknowledge signal.

21. The method of claim 19, wherein the step of generating a first probing signal to detect a protocol-type of a wireless communication module further comprises determining a version of a firmware of the wireless communication module.

22. The method of claim 21, wherein the step of determining a version of the wireless communication module further comprises:
    entering a crisis mode, when the firmware of the wireless communication module is not up-to-date; and
    updating the firmware of the wireless communication module;
    wherein the step of entering a crisis mode further comprises stopping all work in operation.

23. The method of claim 19, wherein the host machine comprises a portable electronic device.

24. The method of claim 23, wherein the portable electronic device comprises a PDA, a laptop, a tablet PC or a smart phone.

25. The method of claim 19, wherein the host machine comprises a desktop.

* * * * *